United States Patent [19]

Niskin

[11] 3,955,412
[45] May 11, 1976

[54] WATER CURRENT FORCE MEASURING APPARATUS

[76] Inventor: Shale J. Niskin, 2941 Lucaya St., Miami, Fla. 33133

[22] Filed: Apr. 1, 1974

[21] Appl. No.: 456,729

[52] U.S. Cl. ............................................ 73/170 A
[51] Int. Cl.² ..................................... G01D 3/00
[58] Field of Search ............. 73/170 A, 170 R, 184; 340/29; 116/DIG. 34, 43/44.98

[56] References Cited
UNITED STATES PATENTS

| 3,695,103 | 10/1972 | Olson | 73/170 A |
| 3,841,015 | 10/1974 | Gregory | 43/44.98 |

*Primary Examiner*—Jerry W. Myracle
*Attorney, Agent, or Firm*—Salvatore G. Militana

[57] ABSTRACT

A water current force measuring apparatus consisting of a pliable rope or line suspended in the water with its lower end anchored to the bottom while the length of the line is subjected to the forces of the current. The upper end of the line is secured to a tensiometer or strain gauge, which in turn is connected to a float or a series of interconnected buoys or floats. Those floats that submerge, balance the total horizontal current-generated force or drag on the line, which is recorded on the tensiometer. These readings are a measure of the total current forces acting on the line by the surface and subsurface currents to permit the ready determination of the total kinetic energy of the currents. Upon obtaining continuous readings of the strain gauge over a definite period, wave heights and lengths, as well as tidal and other cyclic and non-cyclic water movements of the body of water can be ascertained.

7 Claims, 4 Drawing Figures

WATER CURRENT FORCE MEASURING APPARATUS

BACKGROUND OF THE INVENTION

1. Field of the Invention

This invention relates to water flow measuring devices and is more particularly directed to an apparatus for measuring the total forces generated by surface and sub-surface currents and other water movements.

2. Description of the Prior Art

At the present time, there is no single apparatus or device capable of determining or measuring with a significant degree of accuracy, the total forces generated by waves and currents of a water column, either continuously or at any specific time. This information is invaluable to scientists and engineers concerned with ocean dynamics having to do with the forces constantly and consistantly being generated by waves, surface and sub-surface currents.

There are two distinct groups or types of apparatus for measuring current fields, from which forces and kinetic energy of a water column can be deduced. The first group includes the taut and compliant instrumented lines in which there are a number of spaced instruments that either record current velocity and direction in the case of the taut wire array or line shape resulting from the forces of the current acting on the compliant line. These systems are highly inaccurate for measuring total instrument forces of the water column for the reason that the instruments are spaced some distance from each other along the full length of the line, leaving unmeasured currents passing the lines between the spaced instruments.

The second method is the free drop or vertically cycling devices in which a water flow measuring instrument moves vertically and measures the entire water column over the period of time that it takes for the instrument to travel the length of the line so that the measure of total forces is not known for any specific moment or time, thereby being at least to that extent, inaccurate in the determination of total forces being generated by the column of water.

My U.S. Pat. No. 3,372,585, belongs to the compliant line group, having a number of slope and azimuth indicators mounted on the line. The accuracy of this apparatus can be no greater than the number of data points derived from instruments attached along the length of the line; the greater the number of instruments mounted on the line, the greater the accuracy; but in any event, this apparatus or any other conventional apparatus is not as accurate as the present invention, as well as being most cumbersome in execution and extremely costly.

SUMMARY OF THE INVENTION

It is a principal object of the present invention to provide an apparatus for accurately and readily measuring the total water movement induced forces generated by surface and sub-surface currents in a body of water.

Another object of the present invention is to provide an apparatus with a strain gauge or tensiometer attached to a line against which the currents effect a drag that is recorded on the gauge as a measure of the total forces of the currents along the full length of the line.

A further object of the present invention is to provide an apparatus for measuring the forces being generated by currents and other water movements in a body of water and thereby determining wave heights and lengths and other patterns of water movement.

A still further object of the present invention is to provide an apparatus consisting of a pliable line, anchored to the bottom of a body of water, a strain gauge secured to the line with a series of buoys counterbalancing the forces of the currents, an azimuth recorder and a marker buoy connected at the end of the buoys, which apparatus determines the horizontal forces generated by the currents along the full column of the water along with the wave heights and lengths from which the hydrodynamic characteristics of a water column may be ascertained.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

DESCRIPTION OF THE PREFERRED EMBODIMENT

Figure 1:
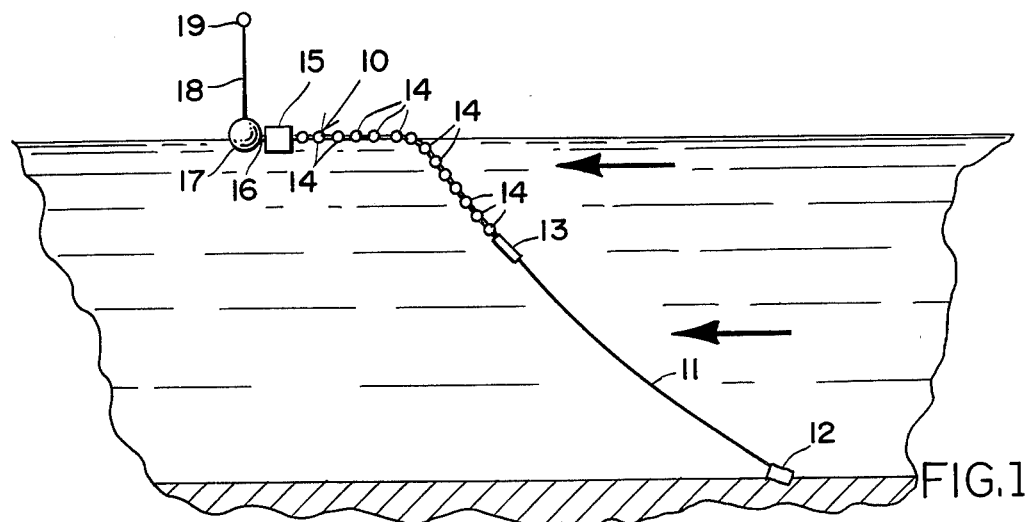
FIG. 1 is a profile view of a body of water in which my apparatus is in position for measuring the forces induced by movement of water whose flow is indicated by an arrow.

Referring to the drawing wherein like numerals are used to designate similar parts throughout the several views, the numeral 10 refers to my apparatus for measuring the integrated or total horizontal forces of the current or currents in a body of water. My apparatus 10 consists of a line or rope 11 on whose lower end is an anchor 12 for securing the lower end of the line 11 against movement on the bottom of water in the current whose horizontal forces are being measured. At the upper end of the line 11 is a conventional tensiometer or strain gauge 13 attached to a series of floats 14, some of which will be normally floating on the surface of the water, while some of them will be submerged to counterbalance the drag created on the line 11 by the horizontal forces generated by the current or currents flowing in the body of water. The number of floats 14 that are submerged will be directly related to the total force of the current flowing past the line 11. For the sake of convenience and in order to obtain direction of flow of the surface current, there is an azimuth sensor 15 secured to the last floating buoy 14 by a line 16 that is secured to a marker buoy 17 provided with a standard 18 on which a flag or light 19 is mounted that permits the easy locating of the buoy 17 and the remainder of the apparatus 10.

Figure 2:
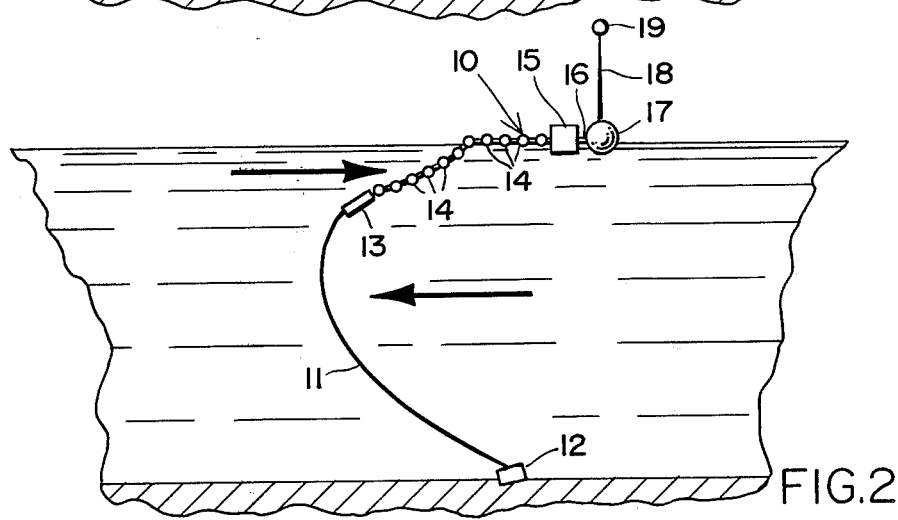
FIG. 2 is a similar view of a body of water wherein a plurality of currents exist and shown by arrows.

In the normal operation of my apparatus 10, the total horizontal forces of the current in the body of water will bear against the line 11 causing a drag or tension on the line 11, which will compel some of the floats 14 to be pulled under the surface of the water, while the remainder of the floats 14 will float on the surface of the water to thereby counterbalance this drag force. The conventional tensiometer or strain gauge 13 will register this force. The readings on the strain gauge 13 and azimuth sensor can be preserved by recorders 15 contained in the sensor housings or can be transmitted to a recording device (not shown) by conventional electrical techniques or self contained in the strain gauge which would then maintain a continuing record of the forces exerted on the line by the currents along with wave height and length. From this information, an integrated force or kinetic energy generated by the currents can be ascertained along with surface current velocity and direction. As shown by FIGS. 1 and 2, the apparatus 10 will be effective to indicate forces from which total horizontal kinetic energy generated by the current (FIG. 1) or currents (FIG. 2) acting in the line can be deduced.

To ascertain kinetic energy from the use of my apparatus shown and described in U.S. Pat. No. 3,372,585 wherein the instruments record one angle of inclination caused by the water currents, an elaborate mathematical analyses is required. Again, the accuracy of the results so determined is based on the multiplicity of the instruments used.

One can readily see that many currents of diverse directions may be found in a body of water as shown aptly in the drawings of my aforementioned patent. To attempt to determine the total kinetic energy of the currents in a body of water using flow meters would require the placing of a series of flow meters in close proximity to each other along the full depth of the body of water in order that those varying velocities be ascertained and the kinetic energy computed thereby. However, the accuracy of such an apparatus would depend upon the spaced intervals between the flow meters and the variations of the currents in the body of water. The greater the intervals between the positions of the current velocity measuring devices and the greater the number of varying currents in the body of water the less accurate the apparatus will be in computing the total kinetic energy of the currents. With applicant's apparatus 10 upon obtaining a reading of the tensiometer 13, the total drag effected by the forces of moving water on the line 11, the total kinetic energy is readily ascertained since there is a direct relation therebetween.

Figure 3:
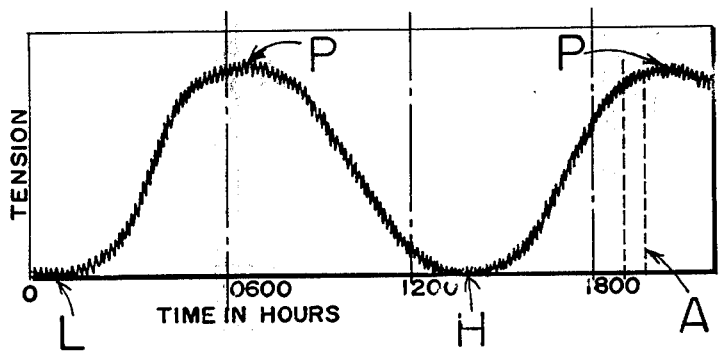
FIG. 3 is a graph showing the relationship between the reading on the strain gauge and time in days to indicate current changes such as tides, etc.
Figure 4:
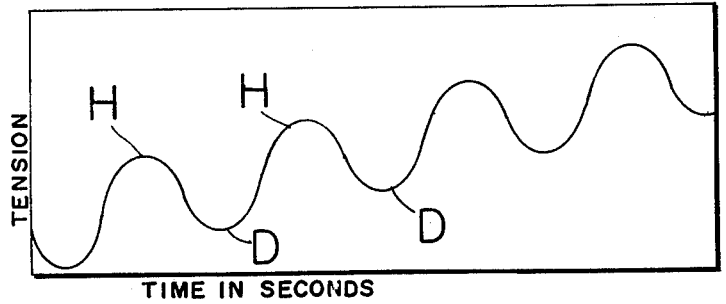
FIG. 4 is a similar graph with time in seconds, indicating the reading of the strain gauge during the period —A— of FIG. 3.

Also, as shown by the graphs indicated in FIGS. 3 and 4, certain tidal and wave characteristics may be ascertained from continuous readings of the tensiometer 13. In FIG. 3, the readings on the strain gauge are recorded as the ordinant and the time in hours as the abscissa of the graph shown therein. The peaks —P— of the graph indicate the moments of highest tension on the tensiometer 13 which are at the time of the mid-tides while the troughs —L—, —H— at zero reading of the tensiometer 13 are the low and high tides. The horizontal distance between the troughs —L— and —H— indicate the time interval between half tides which is approximately 6½ hours.

FIG. 4 is an enlargement of the period —A— of FIG. 3. In this graph the abscissa indicates time in seconds, so that the vertical distance between the peak —H— and trough —D— is a measure from which the height of the wave can be deduced, while the horizontal distance between two successive troughs or peaks D—D, or H—H, is a measure from which the length of the waves can be deduced. Consequently, my apparatus 10 is capable of ascertaining accurately and readily wave, tidal and other water movement characteristics which heretofore had been determined by use of instruments that were not only inaccurate, but were lacking in scientific adroitness.

Likewise variations in water depth caused by waves will be sensed by the tensiometer 13. These realtively short term tension variations around a relatively longer term normal or constant line tension are indications of wave height and length.

All of the aforementioned information concerning ocean dynamics and with the high degree of its accuracy ascertained by the use of my apparatus 10 is of great importance to both scientists and engineers concerned with surface and sub-surface currents in the oceans. Criteria for the construction of off-shore platforms, of moored buoys and the like become readily available as well as the enhancement of man's knowledge of hydro-dynamics of our oceans, etc. This information permits scientists to understand and possibly predict the movement and distribution of suspended sediments, pollutants such as occurs in oil spills and waste dumping in the oceans.

What I claim as new and desire to secure by Letters Patent of the United States is:

1. Apparatus for determining the kinetic energy of currents and the like comprising substantially elongated drag inducing means, means secured at one end for anchoring said drag inducing means in said current, force indicating means secured to the other end thereof, and float means secured to said force indicating means whereby said float means may counterbalance the drag forces effected by said current on said drag inducing means and said force indicating means recording said drag forces, when said apparatus is placed in water of less depth than the length of the drag inducing means.

2. The structure as recited by claim 1 wherein said substantially elongated drag inducing means comprises a pliable line of predetermined drag characteristics and said force indicating means comprising a tensiometer.

3. The structure as recited by claim 2 wherein said float means comprise a plurality of floats connected one to another in series.

4. The structure as recited by claim 3 taken in combination with an azimuth recorder secured to said float in said series farthest from said tensiometer and a marker buoy connected to said azimuth recorder for locating said apparatus.

5. An apparatus as set forth in claim 4 in which at least one of the floats has sufficient reserve buoyancy to insure surface flotation under all ranges of drag forces imposed on the line by moving water.

6. The method for determining the kinetic energy generated by a moving body of water comprising measuring the drag exerted on the entire length of an elongated member of known drag characteristics anchored at one end to the bottom of a body of water and counterbalanced by a plurality of variable buoyant members at the other end.

7. The method as recited by claim 6 wherein said first named member is pliant and substantially vertically disposed.

* * * * *